July 30, 1963 G. KIPER 3,099,197
CENTRAL PHOTOGRAPHIC SHUTTER
Filed Oct. 11, 1960
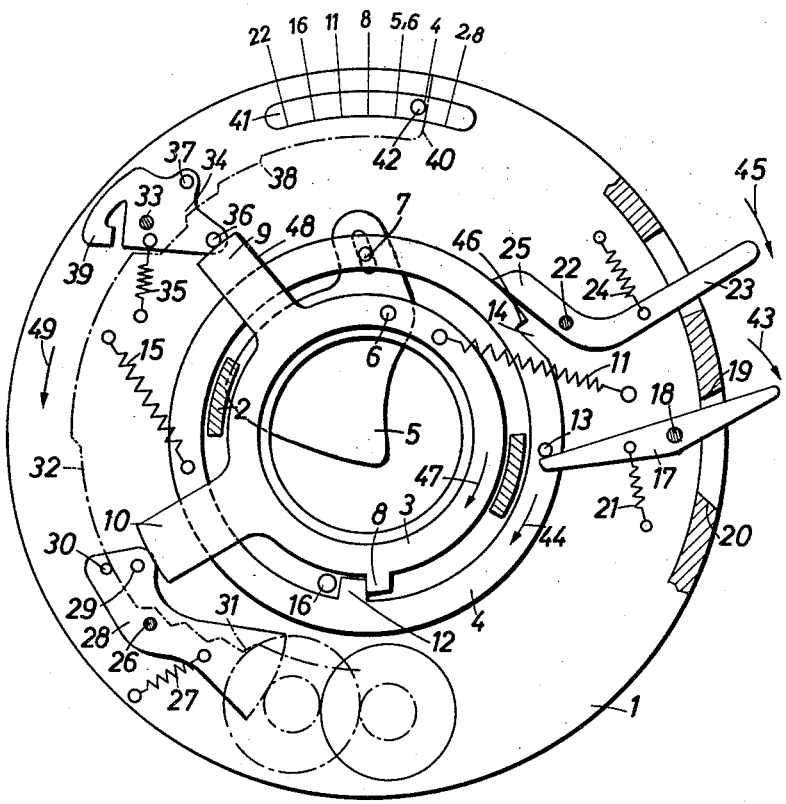
INVENTOR.
GERD KIPER
BY Connolly and Hutz
ATTORNEYS United States Patent Office 3,099,197
Patented July 30, 1963

3,099,197
CENTRAL PHOTOGRAPHIC SHUTTER
Gerd Kiper, Unterhaching, near Munich, Germany, assignor to Agfa Aktiengesellschaft, Leverkusen-Bayerwerk, Germany, a corporation of Germany
Filed Oct. 11, 1960, Ser. No. 62,021
Claims priority, application Germany Dec. 11, 1959
13 Claims. (Cl. 95—63)

This invention relates to a central photographic shutter in which the shutter sectors are opened and closed by changing the angular phase between the pair of concentric rings to which they are operatively connected, and it more particularly relates to such a shutter in which the sectors remain closed as their operating rings are simultaneously wound up to tension their separate driving springs and then are opened and closed during the spring-driven return movement of these rings.

One type of existing shutter of this type utilizes an actuating device which is released together with the sector-opening ring, and influenced by a retarding device to release the sector-closing ring after the sectors have been held open by the opening ring for a prearranged time. Another automatic shutter of this type actuates the release of the sector-closing ring by movement of the sector-opening ring itself. The first of these types accordingly operates by utilizing a separate actuating element released at the same time as the shutter-opening ring for releasing the shutter-closing ring, and the motion of this actuating element is influenced by a retarding device. This first type of shutter provides an efficient shutter opening pattern, but it is rather complicated and expensive particularly with respect to the second described type. Furthermore, it also has the disadvantage of requiring that the actuating element, which is released together with the initially moving sector-opening ring, engage a retarding device as well as releasing the latch holding the second ring which closes the sectors. This makes it difficult for this type of shutter to attain short exposure times because the driving spring of the actuating element which is being retarded by a retarding device is often too weak to rapidly unlock the latch holding the sector-closing ring.

The second type of shutter previously described has the efficiency of its opening pattern impaired because the actuation of the release and the initial retarding of its shutter-closing ring occur while the sectors are fully opened. This necessitates that the sectors must overlap the effective diaphragm opening. Although fairly efficient opening patterns may be achieved thereby for the longer shutter opening times, it is difficult to obtain short exposure times thereby because of the inherently long period that a shutter of this type must remain open. This time is also extended by the time required for the actuating element to release the second sector ring. Furthermore, these existing shutters do not take advantage of the fact that it is possible during the shorter shutter opening times, such as 1/400 or 1/500 second, to operate satisfactorily at a lower degree of shutter efficiency.

An object of this invention is to provide a simple, economical and dependable central photographic shutter which operates efficiently over a wide range of shutter operating speeds.

In accordance with this invention both of the sector-operating rings of a central shutter are simultaneously released. A retarding device acts upon the shutter-closing ring to retard its motion and thereby momentarily vary the angular relationship between it and the shutter-opening ring after they are released. The sectors open while the rings are out of phase and then close when they come back into phase at the end of their movement to provide the desired shutter opening time.

In accordance with one aspect of this invention, both of these sector rings may be tensioned by a winding lever which acts upon the slower-moving sector ring which is engaged with the other ring in the tensioning direction by a mutual pair of interlocking projections. This winding lever may be constructed to slip from the ring that it winds after it has fully tensioned it to provide an automatically-operating type of shutter.

In accordance with another aspect of this invention, at least two retarding devices are operatively engaged with one of the sector-operating rings. These retarding devices may have different operating characteristics in accordance with the ranges of speeds that they influence, and one of them may accordingly be formed by an inertia lever and the other by a geared retarding device. The inertia lever may incorporate a movable arm for adjusting its inertia and accordingly its retarding characteristics.

Furthermore, in accordance with this invention, the control device or cam which adjusts or sets the action of the retarding devices may be coupled to a control element which sets the opening of the diaphragm. The coupling between them is aranged to prevent the diaphragm from being opened beyond a certain amount when the shutter is being operated within a certain range of speeds.

A shutter of this invention avoids all of the aforementioned disadvantages of the previously described existing central shutters because both sector-operating rings are simultaneously released upon actuation of the shutter. One ring is allowed to return to its untensioned condition freely under the force of its driving spring. However, the other ring is retarded by engagement with a retarding device. This causes the variation in angular phase between the rings which is required to first open the sectors and then close them as both of them move individually from their tensioned to untensioned positions. The degree of variation in phase during the consecutive movements of these rings back to their starting condition directly influences the shutter opening time. This shutter opening time can be freely regulated within its range by controlling the degree of engagement of the retarding device with its ring. In particular, it is also possible to vary the retarding effect so that the sectors open only a trifle during their movement which considerably shortens the shutter time and accordingly minimizes the amount of opening, the forces imposed, and the inertia which must be overcome in comparison with the pre-existing aforementioned types of drives. In one extreme condition the opening time of the shutter can even be reduced to nothing. Should any effective retarding effect be imposed which is even smaller than that applied in the aforementioned extreme limiting condition, the shutter does not open completely. However, if the diaphragm setting of the shutter is correspondingly reduced, this condition can be utilized for extremely fast shutter times. The control for a diaphragm, such as an iris diaphragm, can therefore be connected with the control element setting the shutter time in such a manner that the fastest times can only be set with correspondingly reduced diaphragm openings.

Novel features and advantages of the present invention will become apparent to one skilled in the art from a reading of the following description in conjunction with the accompanying drawing wherein similar reference characters refer to similar parts and in which the single FIGURE is a sectional view in elevation taken through a shutter which is one embodiment of this invention.

In this single figure is shown a shutter housing 1 upon which sector-operating rings 3 and 4 are concentrically movably mounted upon opposite sides of annular projections 2. A number of shutter sectors 5, of which only one is shown for simplicity of presentation, are rotatably connected to rings 3 and 4 by pins 6 and 7. Ring 3 includes a radially extending driving projection 8 and two longer radially extending arms 9 and 10. A driving spring 11 of the tension type reacts between sector 5 and a stationary portion of housing 1. Ring 4 includes an inwardly extending lug 12 which engages driving projection 8 upon ring 3. A driving pin 13 extends from the side of ring 4, and a latching slot 14 is cut into its surface. Driving spring 15 of the tension type also reacts between ring 4 and a stationary portion of housing 1. An arresting stop 16 extends from housing 1 into the path of movement of lug 12 to stop lugs 12 and 8 and rings 4 and 3 in the fully released position.

Winding or tensioning lever 17 is rotatably mounted upon housing 1 upon pin 18, and it extends through the side of shutter casing 1 for movement between a pair of motion-limiting surfaces 19 and 20. Spring 21 reacts between lever 17 and housing 1 to automatically move it back to the reset position after actuation. Latching or release lever 23 is also rotatably mounted upon housing 1 by pin 22, and a spring 24 reacts against it in a direction to urge it into contact with the grooved surface of ring 4. The inner locking end 25 of lever 23 is arranged for engaging groove 14 when the shutter is wound or tensioned to lock it in the tensioned or cocked condition.

Arms 9 and 10 extending from ring 3 are arranged for either individually or jointly reacting with retarding devices for regulating the shutter opening time. One of the retarding devices associated with these arms is of the geared type, and it includes a gear-toothed sector 28 which is rotatably mounted upon housing 1 by pivot 26. A spring 27 reacts between sector 28 and housing 1 in a direction to reset sector 28 after it has performed a retarding movement. Sector 28 is, as diagrammatically illustrated, engaged with pinions, gears and flywheels and also in certain instances, with an armature and balance wheel to exert a retarding influence against its enforced rotation. Sector 28 also includes a pin 29 which engages arm 10 of ring 4 to permit it to exert a retarding effect thereon. It also includes a control pin 30 which engages a time-setting camming surface 31 of a shutter time-setting ring 32 which is merely schematically represented.

The other retarding device is provided by a relatively simple retarding lever 34 rotatably mounted upon housing 1 by a pivot 33. Spring 35 reacts against lever 34 in a direction which forces actuating pin 36 of lever 34 into retarding contact with arm 9 of ring 4. Lever 34 also includes a control pin 37 which engages shutter time-setting camming surface 38 of shutter time-setting ring 32. An adjusting arm 39 is also provided upon lever 34 and it can be bent closer or further from pivot 33 to regulate the inertia of lever 34 and consequently its retarding effect.

Shutter time-setting ring 32 is also interlocked with a pin 42 connected with the control for setting the diaphragm setting opening (not shown) by engaging it with limiting surface 40. Pin 42 accordingly extends into proximity with shutter time-setting rings 32 through an annular slotted aperture 41 in housing 1. The positions of pin 42 corresponding to the standard diaphragm opening stops are indicated along slot 41.

*Operation*

The shutter is wound or tensioned by rotating tensioning lever 17 in the direction of arrow 43 to react upon pin 13 and rotate ring 4 in a direction opposite to arrow 44 to tension driving spring 15. Near the end of the tensioning movement of lever 17, release lever 23 is engaged under the action of its spring 24 with groove 14 in ring 4 to latch it in the cocked condition against the tension of its driving spring 15.

Sector ring 3 is simultaneously wound into the tensioned condition with ring 4 by virtue of the engagement of lugs 8 and 12 of rings 3 and 4, and it is maintained together with ring 4 in the latched condition by virtue of the continued engagement of lugs 8 and 12 as long as ring 4 is locked in the latched condition.

When rings 3 and 4 are in the wound position, the two retarding devices incorporating toothed sector 28 and lever 34 may respectively engage arms 10 and 9 of ring 3 to the extent determined by the position to which the shutter time-setting ring 32 incorporating timing cam surfaces 31 and 38 is set. Furthermore, the settings of lever 34 and toothed sector 28 can even be varied after the shutter is tensioned by adjusting shutter time-setting ring 32. In the illustrated setting of time-setting ring 32, toothed sector 28 is held completely out of the path of movement of arm 10 so that it will not retard the movement of ring 3. However control pin 37 of lever 34 is not engaged by camming surface 38, and spring 35 accordingly urges pin 36 into retarding contact with arm 9. Lever 34 can, therefore, remain in retarding engagement with arm 9 until its control pin 37 engages camming surface 38 upon the release movement of ring 3 and arm 9. The illustrated shutter time-setting provides a relatively short shutter opening time because only lever 34 retards the movement of ring 3 and even this only during a small portion of its movement because camming surface 38 will quickly engage control pin 37 and prevent lever 34 from remaining in retarding engagement with arm 9 over its entire path of movement. The resulting shutter opening pattern is not quite sufficient to obtain an opening equivalent to the full possible diaphragm opening of the camera. For a pattern of adequate efficiency, it is, therefore, necessary to reduce the effective aperture opening by reducing the diaphragm setting to slightly less than the shutter opening which is obtained. This is accomplished by connecting shutter time-setting ring 32 with the diaphragm opening control by the aforementioned coupling of limiting surface 40 of shutter time-setting ring 32 with pin 42 of the diaphragm opening control. In the illustrated position, the diaphragm cannot be opened beyond the f/4 station. This prevents a diaphragm opening which is larger than the effective shutter opening from being utilized.

The shutter is released by rotating release lever 23 in the direction of arrow 45. This disengages end 25 of lever 23 from the interlocking edge 46 of groove 14 of sector-operating ring 4. This simultaneously releases sector-operating rings 3 and 4 which are rotated by driving springs 11 and 15 in the direction of arrows 47 and 44. The release motion of sector opening ring 4 is not retarded until it arrives at its fully released position by the arrestment of lug 12 upon stop 16. However, the motion of ring 3 is immediately retarded by virtue of the engagement of leading surface 48 of arm 9 upon pin 36 of inertia lever 34. This almost immediately retards the motion of ring 3 which causes a variation in angular phase between rings 4 and 3 thereby opening sectors 5. Sectors 5 remain open as long as rings 4 and 3 are sufficiently out of angular phase. Sectors 5 rotate together with rings 3 and 4 and start to close only when the difference in angular phase between moving sector rings 3 and 4 starts to decrease. This usually occurs after sector opening ring 4 is arrested upon stop 16. Sector rings 5 then move to the closed position during the completion of the release movement of sector ring 3, and upon its full release rings 3 and 4 are back again in the position illustrated in the drawing.

The shutter time may be even further reduced by rotating shutter time-setting ring in the direction of arrow 49. This further restricts the rotation of retarding lever 34 towards arm 9 and accordingly reduces the retarding effect upon it. This simultaneously limits the diaphragm opening even more which enforces the use of smaller diaphragm openings by moving pin 42 of the diaphragm setting control by contact with limiting surface 40 of shutter time-setting ring 32 towards the range of smaller aperture opening. Furthermore, the shutter time-setting can be also adjusted by bending arm 39 towards or away from pivot 33 which either decreases or reduces its inertia, accordingly resulting in shorter or longer shutter opening times. However, when shutter time-setting ring 32 is rotated opposite to the direction of arrow 49, the shutter opening times are lengthened.

During the first phase of movement of ring 32 in this direction, lever 34 is permitted to engage arm 9 during a maximum amount of its path of travel. However, when ring 32 is adjusted further in this same direction, lever 34 is completely removed out of the path of travel of arm 9 by camming surface 38. At this same time, the previous restraint of toothed sector 28 from the path of travel of arm 10 is reduced by virtue of the configuration of camming surface 31. This allows the released motion of sector ring 3 to be then retarded by the relatively greater inertia of the geared retarding device to provide a range of longer shutter opening times.

The basic operating principle of this type of shutter does not require the use of two separate retarding elements, and it can also utilize one or more than two retarding devices in a great variety of combinations. The manner in which these retarding devices are arranged greatly affects the range of opening times provided by the shutter. This also pertains to the enforced reduction in diaphragm opening which can be eliminated under certain conditions such as where extremely short shutter opening times are not required or where the use of stronger driving springs is permissible.

The basic principle of this invention is also not limited to shutters which are separately wound and released. Where automatic shutters are utilized, release lever 23 and locking surface 25 may be eliminated. In that case, winding lever 17 is adjusted to disengage from pin 13 after the shutter is fully wound which automatically permits the shutter actuating motion to begin immediately after the shutter is tensioned.

What is claimed is:

1. A photographic shutter of the central type comprising a pair of rotatably mounted concentric sector-operating rings, a number of shutter sectors, each of said sectors being movably connected to both of said rings to cause them to open and close said sectors when the angular phase between said rings varies from a normal condition and returns to it, driving means connected to each of said rings for imparting separate driving forces to them, tensioning and releasing means connected to said rings for causing said rings to simultaneously commence their driven movement and a retarding device being operatively connected to one of said rings for selectively delaying the speed of its rotation relative to the other for momentarily varying said angular phase to cause said sectors to open and close an amount which is a function of said delay, and a control element operatively engaged with said retarding device to permit the shutter opening time and pattern to be selectively adjusted.

2. A photographic shutter as set forth in claim 1 wherein a pair of said retarding devices having different retarding characteristics are operatively associated with said one of said rings.

3. A photographic shutter as set forth in claim 1 wherein said driving means comprise springs which are independently connected to each of said rings.

4. A photographic shutter as set forth in claim 2 wherein a winding lever is operatively connected with said one of said rings for cocking it against the tension of its driving spring, and said rings incorporate mutually interlocking projections which engage each other in the untensioned condition in a manner which permits both of said rings to be simultaneously tensioned.

5. A photographic shutter as set forth in claim 4 wherein a latching means is connected to the ring upon which said winding lever operates for locking said rings in the tensioned condition.

6. A photographic shutter as set forth in claim 5 wherein said winding lever is constructed to slip free of said ring after it is fully tensioned to allow it to serve as a release lever as well as a tensioning lever.

7. A photographic shutter as set forth in claim 1 wherein at least two spring retarding devices are operatively connected with said one of said rings, said retarding devices having different retarding characteristics, and said control element being associated with said retarding devices for utilizing them in predetermined patterns during the operation of said shutter.

8. A photographic shutter as set forth in claim 7 wherein one of said retarding devices comprises an inertia lever, and the other of said devices comprises a geared retarding device.

9. A photographic shutter as set forth in claim 8 wherein said inertia lever incorporates an arm whose position relative to the pivot of said lever may be varied to adjust the inertia of said device.

10. A photographic shutter as set forth in claim 1 wherein a diaphragm adjusting element is mounted adjacent said shutter, and said control element is operatively connected with said diaphragm adjusting element to prevent said diaphragm from being opened beyond a predetermined minimum during certain ranges of operation of said shutter.

11. A photographic shutter as set forth in claim 1 wherein said sector-operating rings are mounted one within the other, a pair of lugs extending from adjacent surfaces of said rings which engage each other when said rings are in the untensioned condition, a projection extending from said casing into the path of movement of said lug upon the outermost sector-operating ring for simultaneously arresting said rings in the untensioned condition, said lug upon the innermost sector-operating ring engaging the other lug in the direction of its release movement, a tensioning lever being rotatably mounted upon said casing adjacent said outermost ring, and projection means upon said outermost ring for engaging said tensioning lever with said outermost ring to permit said tensioning lever to tension both of said rings by virtue of the engagement of said lugs.

12. A photographic shutter as set forth in claim 11 wherein said innermost ring includes a pair of radially extending arms, and said pair of retarding devices respectively engage said arms.

13. A photographic shutter as set forth in claim 12 wherein one of said retarding devices exerts a relatively weaker effect and the other of said retarding devices exerts a relatively stronger effect, and said control element being engaged with said retarding devices in a manner which first engages said weaker retarding device with one of said arms throughout the faster range of shutter operating times and engages said stronger retarding device with the other of said arms through a range of slow shutter operating times.

References Cited in the file of this patent

UNITED STATES PATENTS

| | | |
|---|---|---|
| 2,412,673 | Carroll | Dec. 17, 1946 |
| 2,578,604 | Santoni | Dec. 11, 1951 |
| 2,601,286 | Henry | June 24, 1952 |
| 2,862,431 | Noack | Dec. 2, 1958 |
| 2,890,640 | Noack | June 16, 1959 |